INVENTOR
WILLIAM W. CARLIN

BY
ATTORNEYS

з,454,478
Patented July 8, 1969

3,454,478
ELECTROLYTICALLY REDUCING HALIDE IMPURITY CONTENT OF ALKALI METAL DICHROMATE SOLUTIONS
William W. Carlin, Portland, Tex., assignor to PPG Industries, Inc., Pittsburgh, Pa., a corporation of Pennsylvania
Continuation-in-part of application Ser. No. 467,436, June 28, 1965. This application Aug. 8, 1967, Ser. No. 659,215
Int. Cl. C01g 37/14; B01k 1/00
U.S. Cl. 204—130                                11 Claims

ABSTRACT OF THE DISCLOSURE

The selective decomposition of alkali metal halide impurities in alkali metal chromate and/or dichromate solutions is shown utilizing an electrolytic cell with or without a diaphragm. Diaphragms when employed can be conventional asbestos diaphragms such as are employed in alkali-chlorine cells. Permionic membranes are also disclosed as diaphragms.

This application is a continuation-in-part of applicant's copending application Ser. No. 467,436, filed June 28, 1965, now abandoned.

Background of the invention

The production of sodium dichromate has been effected conventionally by utilizing chromite ore as the raw material. The chromate ore which has the approximate composition $FeOCr_2O_3$ normally is rosted with soda ash or potassium carbonate with the consequent formation of sodium or potassium chromate. The resulting sodium or potassium chromate is then extracted from the calcined mixture and the chromate solution thus produced is reacted with an acid to convert the monochromate solution to dichromate. In most cases the acid utilized has been sulfuric acid. In some cases carbon dioxide has been used as the acid for conversion of the alkali metal chromate solution to the alkali metal dichromate solution.

A typical sulfuric acid based process is described in U.S. Patent 2,612,435, issued Sept. 30, 1952. A typical illustration of the process in which carbonic acid is employed to form alkali metal dichromate from alkali metal chromate raw liquors recovered from the leaching of the roast material is described in U.S. Patent 2,931,704, issued Apr. 5, 1960.

In each of these processes the presence of alkali metal carbonate, alkaline earth metal oxides and carbonates in the roasting mix introduce into the system certain quantities of chloride ions which show up as impurities in the various chromate and dichromate liquors being fed to crystallizers in the over-all system for ultimate recovery of product. Thus, after roasting the chromite ore and alkali compounds, the roasted material is leached with water in order to recover the soluble chromate salts. An aqueous solution of alkali metal chromate salts is then further processed in order to obtain solid alkali metal chromate and solid alkali metal dichromate salts. When the crystallization of the alkali metal chromates and alkali metal dischromates is attempted from liquors which are heavily contaminated with alkali metal halides, these alkali metal halides are crystallized with the chromate and dichromate salts. This produces products which are frequently not of sufficient purity for certain specific applications such as chrome plating baths, as oxidizing materials for organics and the like. Further, in order to provide efficient utilization of chrome values recovered from chromate ores, chrome liquors obtained during the crystallization of the chromate and/or dichromate salts are frequently recycled in the system to insure minimum loss of chrome values. It will be appreciated that recycle of mother liquors in this manner results in the accumulation in the process systems of excessive amounts of halide ions where these are present. These halide ions, usually chloride ions, as they build up in the system must be removed one way or the other. The amount of chloride found to be present in the liquors is generally below 10 percent by weight, based upon the weight of $CrO_3$ in the liquors usually being not in excess of about 5 percent by weight normally being in the range of 0.05 to 2 percent by weight on such basis. One of the conventional methods of controlling this buildup is to bleed off and discard portions of these mother liquors being fed to crystallizers or evaporators in order to maintain chloride ion levels below those at which substantial quantities of alkali metal chlorides are crystallized with the desired chromium chemicals.

This has been a particularly bothersome problem in the industry and has been recognized as such in the art typified, for example, in U.S. Patent 2,693,216, issued May 19, 1953. In this patent an involved system for precipitating alkali metal halides as a silver halide precipitate is described for the purpose of maintaining chloride ion levels in chromate and dichromate liquors at a minimum. While this process appears effective for the removal of chloride ion concentrations from chromate and dichromate liquors, it does introduce the element of a silver precipitate in the system which must be removed by filtration steps and also a complicated and costly recovery system is required for silver recovery.

Summary of the invention

In accordance with the instant invention, a new method is provided for removing halide ions from chromate liquors which involves introducing halide ion containing chromate and/or dichromate liquors into contact with an anode in an electrolytic cell whereby the chloride is selectively decomposed by the electrolysis. It has been found that this can be accomplished effectively and the chloride largely removed without significant electrolysis of alkali metal dichromate and consequent deposition of substantial amounts of chromium metal. After the chloride is decomposed the chromate liquor may be removed from the cell and electrolysis discontinued before substantial metal tends to plate out or before substantial amounts of chromic acid are generated. Where the electrolysis is conducted in a cell which does not have a diaphragm between anode and cathode, some chromate tends to be reduced to the trivalent state. To avoid this reduction a dichromate liquor containing chloride may be introduced into the anode compartment of an electrolytic cell.

General discussion

The electrolytic cell is provided with an anode which has a low halide overvoltage. The overvoltage on the anode of the cell should be such that it is lower than that necessary to release or discharge oxygen at the anode prior to discharge of halide. A typical anode material suitable for this purpose is platinum or a member of the platinum group metals. The anode should be inert with respect to the electrolyte, i.e., not attacked thereby. If desired, these metals may be plated or otherwise deposited on a support metal such as titanium, tantalum and the like.

Preferably, the electrolytic cell is also provided with a cathode and diaphragm interposed between the anode and cathode. By virtue of the instant process chromate or dichromate liquors are fed to the anode compartment of the cell while water or caustic soda is introduced into the cathode compartment of the cell. The cell is then operated to electrolyze the material contained in the anode and cathode compartments and cause elemental halide to be discharged as a gas at the anode of the cell. Elemental hydrogen is usually discharged as a gas at the cathode during electrolysis. The chromate or dichromate liquor, as it passes through the cell, is withdrawn from the anode compartment substantially reduced in its halide ion concentration by virtue of the fact that halide ions contained in the chrome liquors fed to the anode compartment are discharged at the anode and removed as a gas. This system is particularly effective in an over-all chromate process since small quantities of dichromate solutions may be removed from the crystallization portion of the process and fed to the cell to maintain chloride concentrations in the over-all dichromate liquor being fed to the crystallizers at an acceptable level.

As a general rule it is best to electrolyze solutions which contain the $CrO_3$ in the dichromate form because sodium chromate or like alkali metal chromate is so alkaline that oxygen tends to be evolved to a greater extent than chlorine. As a rule the pH of the solution should have a pH below that of sodium chromate, i.e., should at least contain some dichromate. The initial pH of such solutions rarely exceeds 8 and frequently is about 5 to 6. Electrolysis normally is discontinued before the pH falls below about 2 since otherwise excessive chromic acid is generated. Chromate liquors may also be utilized in cells of this character, though because of the low chloride ion concentration usually found in these liquors, the size of the cell will be substantially increased. Moreover, the electrolyte efficiency for chloride decomposition falls seriously unless the chromate is treated with acid to reduce the pH.

The concentration of the solutions may be at any convenient value. Usually however solutions containing at least 40 percent, preferably not less than 50 percent, by weight of $CrO_3$ are treated since these solutions contain a higher chloride concentration based upon the solution and smaller cells may be used.

In the preferred mode of operating the instant system small bleed streams of dichromate solution from the crystallizer system utilized to recover sodium dichromate are fed to an electrolytic cell and the halide ion concentration of the bleed stream reduced substantially during its passage through the cell. This liquor may be then recycled to the dichromate recovery system and by periodically treating side streams of this character the halide ion concentration in the over-all dichromate recovery system can be maintained at a level such that alkali metal halide is not crystallized with alkali metal dichromate being crystallized. Also by virtue of this instant invention, since as shown in U.S. Patent 2,693,216 mentioned above dichromate return liquors are utilized for further recovery of their chromate values, this treatment of the alkali metal dichromate liquor stream heavily concentrated in alkali metal chloride substantially reduces the over-all halide contamination of the chromate liquors being fed to the system for recovery of both chromate values and dichromate values.

The utilization of a diaphragm cell avoids reduced chromium in chromate liquors as a further benefit to be gained by operating a chromate system in the manner herein described. Preferably a cationic ion permeable membrane is selected as the diaphragm material to avoid the loss of chromium to the cathode compartment of the cell. While an ion permeable membrane forms the preferred mode of operating an electrolytic cell in accordance with the instant invention other type diaphragm cells may be employed. Thus, conventional asbestos diaphragms may be utilized, impregnated diaphragms such as those impregnated with drying oils, and ceramic materials which have been utilized as diaphragms in the electrolytic cell art may also be employed. In utilizing these latter type materials it will be understood by those skilled in the art that some $CrO_3$ will migrate by diffusion through the diaphragm to the cathode compartment of the cell. For this reason it is preferable that an ion perm selective membrane diaphragm be employed which is impervious to the flow or passage of $CrO_3$ ions from the anode compartment to the cathode compartment of the cell but which is pervious to the passage of alkali metal ions.

For a more complete understanding of the present invention reference is made to the accompanying drawings in which.

Figure 1:
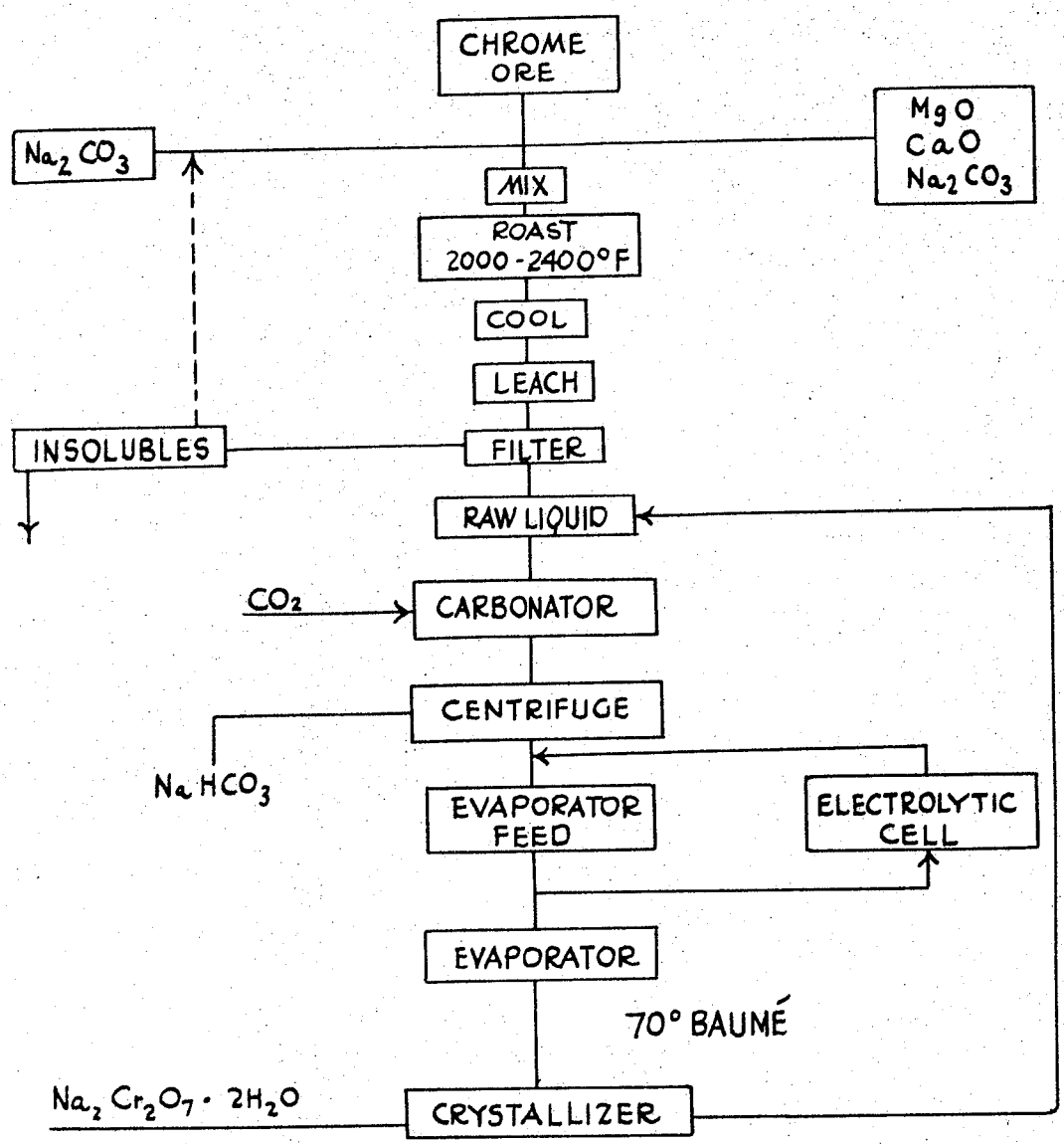
FIGURE 1 is a flow sheet of a chrome process in which chrome ore is roasted and subsequently treated to recover sodium dichromate values therefrom.

In the operation of a chrome process in accordance with the present invention for the production of sodium chromate by a system such as shown in FIGURE 1, the chrome ore is mixed with sodium carbonate and lime or dolomite lime and roasted at conventional roasting temperatures in the neighborhood of 2,000 to 2,400° F. The roast is then cooled and leached with water and filtered to remove insolubles. Insolubles may be discarded or recycled to some other part of the process. For example, these insolubles may be recycled to the chrome ore mixing step as shown in FIGURE 1 by introducing them with the sodium carbonate to chrome ore.

The liquor from the filtration step is then passed into a carbonator where $CO_2$ is introduced and carbonation of the raw liquor takes place. The discharge from the carbonating step is centrifuged to remove the sodium bicarbonate formed during carbonation and the liquor is fed to an evaporator feed tank. The evaporator feed tank is utilized to feed liquor to an evaporator where the chrome liquor is evaporated to a 70° Baumé concentration. The liquor emerging from the evaporator is then pased into a crystallizer where sodium dichromate dihydrate ($Na_2Cr_2O_7 \cdot 2H_2O$) is produced. The liquor from the crystallizer is recycled in conventional manner to the raw liquor step. In conducting this process a small bleed stream preferably from the evaporator feed tank line leading to the evaporator is introduced into an electrolytic cell of the type shown in FIGURES 3 and 4. During its passage through the cell the sodium dichromate liquor is electrolyzed and elemental chlorine is evolved. The sodium dichromate liquor is then removed from the anode compartment of the cell where it had been introduced and it is recirculated to the evaporator feed tank. In this manner by treating a small side stream of material which is being evaporated for eventual crystallization a careful control on the chloride concentration of material entering the crystallizer can be readily achieved.

This process has equal applicability to a process in which sulfuric acid is utilized to provide a sodium dichromate dihydrate product. Thus, as shown on the flow sheet of FIGURE 2, chrome ore, sodium carbonate and lime are mixed, roasted at conventional roasting temperatures, and cooled. The cooled roast is then leached with water and the resulting liquor is filtered to remove insolubles. Once again these insolubles can be recycled to the system or may be discarded as desired.

The raw liquor resulting from the filtration step is then treated with sulfuric acid, preferably 78 percent concentration, and a further filtering step is conducted to remove alumina hydrate which may be formed. The neutral liquor is then treated with further quantities of sulfuric acid and concentrated to 60 Baumé concentration. The treated liquor then enters a crystallizer. The liquor from the first crystallizer is centrifuged to remove sodium sulfate. The liquor from the centrifuging step is red liquor and is concentrated in a further concentration step to 70 Baumé concentration, passed to a crystallizer and ultimately centrifuged to recover a sodium dichromate dihydrate ($Na_2Cr_2O_7 \cdot 2H_2O$) product. The liquor from the final centrifuging step may be returned to the red liquor stage or to some other portion of the process as desired.

Figure 2:
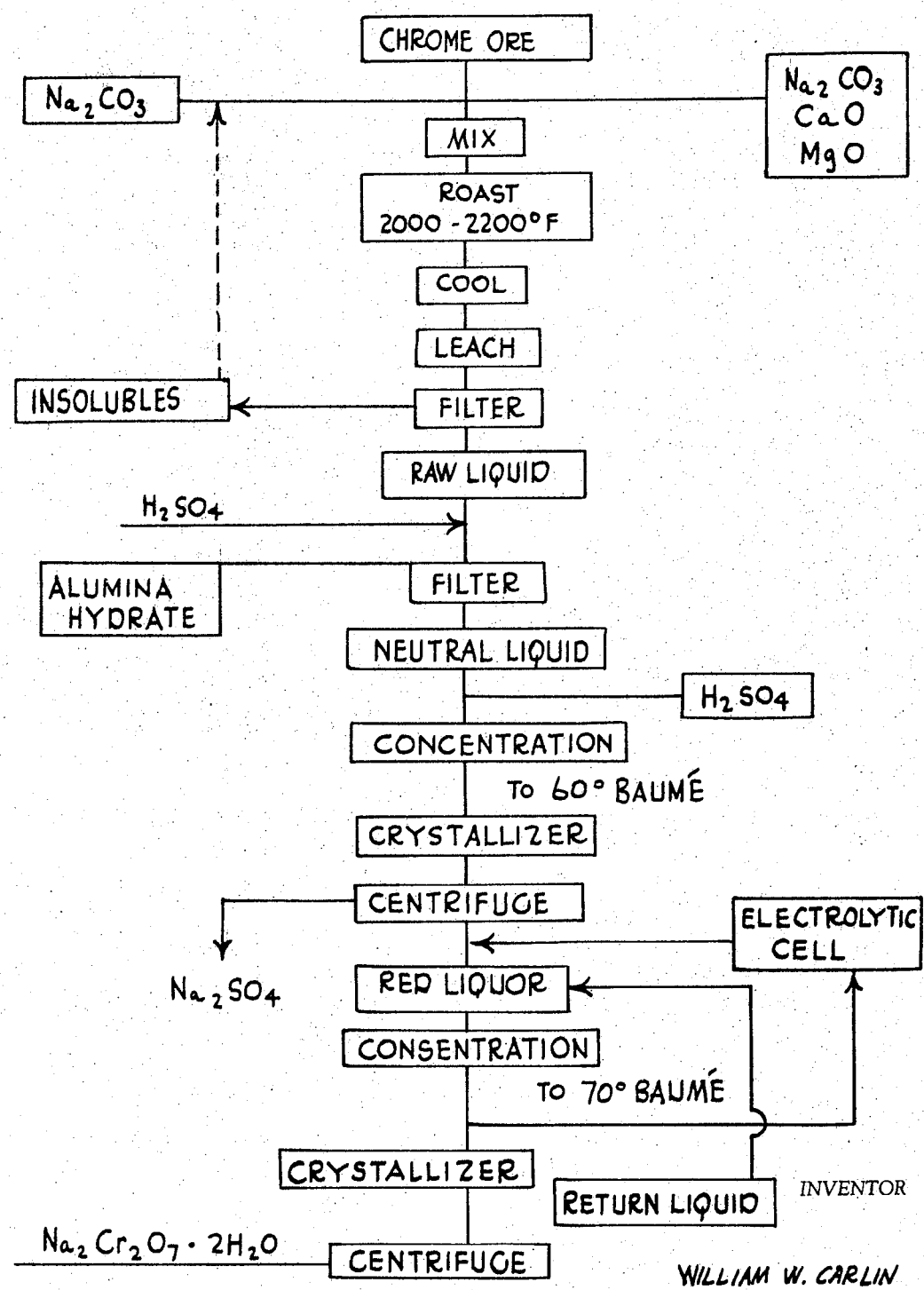
FIGURE 2 is a flow sheet of a chrome process in which chrome ore is roasted and subsequently treated to recoved sodium dichromate.

In applying the present invention to a process of this type as shown diagrammatically in FIGURE 2, a bleed stream is taken off from the red liquor feed to the crystallizer shown in the flow sheet and passed to the anode compartment of an electrolytic cell, preferably of the permionic membrane type. During its passage through the anode compartment of the cell, the alkali metal halide containing dichromate liquor is eletrolyzed and the chloride ions contained in the liquor are discharged at the anode of the cell as chlorine gas. The dichromate liquor substantially depleted of its chloride ion concentration is then returned to the red liquor storage tank above the concentration zone as shown in the flow sheet. In this manner once again it is possible to control chloride ion concentration in the over-all process by merely treating a small side stream for the complete removal or substantially complete removal of the chloride ion concentration.

Figure 4:
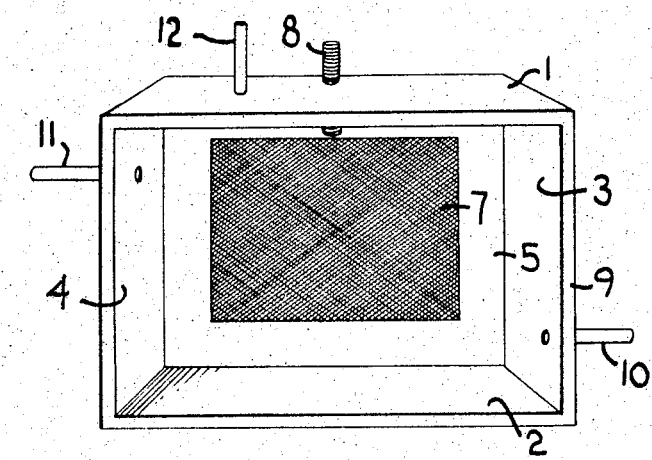
FIGURE 4 is a drawing of a cell suitable for use in removing halide ion chromate or dichromate liquor with the cathode compartment broken away to show the cell anode.

With respect to the electrolytic cell employed in the instant invention an embodiment of the anode section of such a cell that may be utilized is shown in FIGURE 4. In this cell the cell is composed of a top member 1, a bottom member 2, side members 3 and 4, and a back member 5. Positioned in the cell or suspended in this portion of the cell is a flat platinized titanium anode member 7. This anode member is suspended or positioned in the cell by an electrical connecting rod 8. On the face of the open side of the cell shown in FIGURE 4 is a gasket member 9. The cell is provided with an electrolyte introduction pipe 10 and a product withdrawal pipe 11 as well as a vent pipe 12 for the removal of gaseous materials from this compartment of this cell. An identical half cell is utilized for the cathode compartment of the cell. The only difference being that the electrode material used in the cathode compartment is preferably steel.

Figure 5:
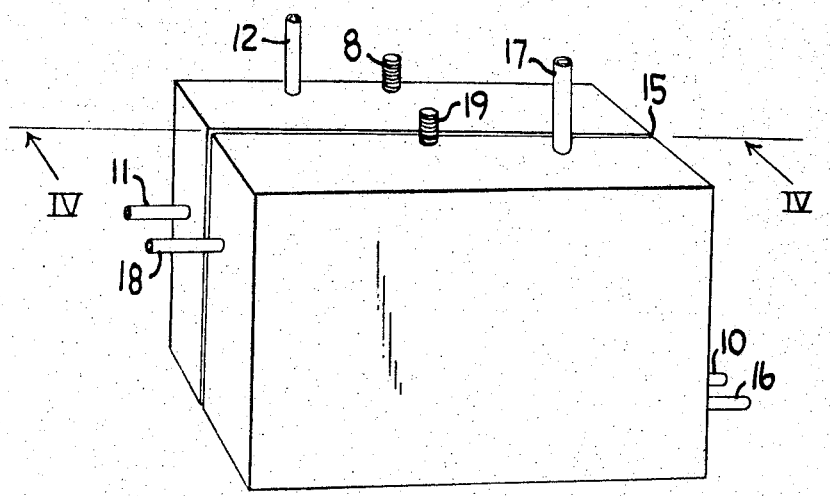
FIGURE 5 is a drawing in perspective of the entire cell cathode compartment in place showing the feed inlets and feed outlets and gas vents of the cells as well as the electrical connections to the cell.

Both cell halves of the type shown in FIGURE 4 are placed together as a unitary cell as shown in FIGURE 5. The membrane 15 of the cell in assembled condition is located between the two cell halves and, of course, the cathode containing section of the cell has feed pipe 16, a gas pipe vent 17, and a product outlet pipe 18 located thereon as well as an electrical connector 19 which is affixed to the cathode of the cell and suspends the cathode in the cathode compartment of the cell.

Figure 3:
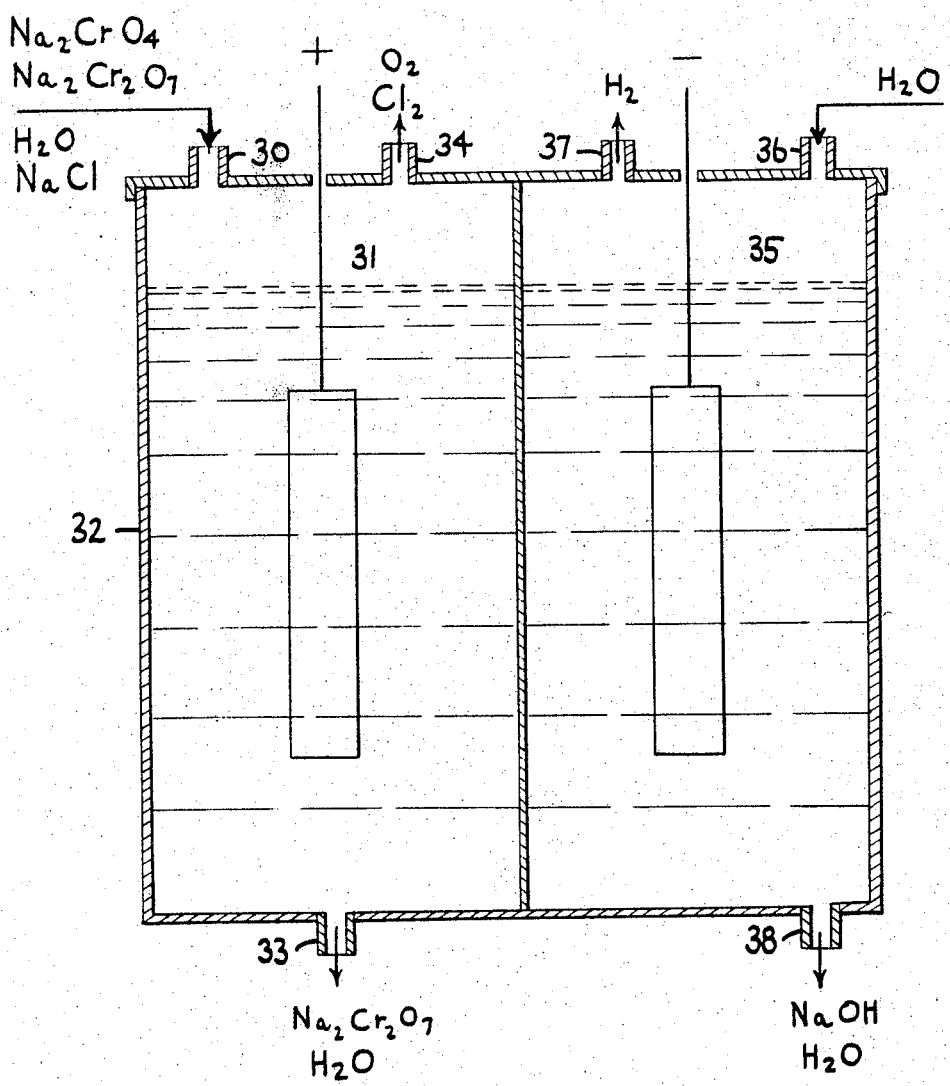
FIGURE 3 is a diagrammatic illustration of the evaporator feed to an electrolytic membrane cell utilized for chloride removal.

The over-all operation of this cell is shown diagrammatically in FIGURE 3. As shown therein, an evaporator feed containing sodium chromate, sodium dichromate, water and sodium chloride is fed through inlet 30 to the anode compartment 31 of the cell 32 at a rate of about 2 to 5 gallons per minute. This solution has a specific gravity of approximately 1.6 and a pH of below 7 generally ranging between 5 and 6. The evaporator feed material entering the anode compartment of the cell is electrolyzed therein and is ultimately removed from the cell at the same 2 to 5 gallons per minute rate but substantially depleted of its chloride content through outlet 33. Chlorine gas is removed via outlet 34. The cathode compartment 35 of the cell 32 is continuously fed with water through inlet 36 at a rate of approximately 0.05 to 0.15 gallon per minute. Initially in the start of this cell it is advisable to introduce a small quantity of caustic soda to provide the necessary electrical properties to the electrolyte contained in the cathode compartment to insure proper elcetrolysis. Once electrolysis has started, however, it will no longer be necessary to add caustic soda thereto since sodium ion migration across the permionic membrane 15 will result in the formation of caustic soda in the cathode compartment 35. Chlorine and oxygen are discharged from the anode compartment of the cell through vent 34 and hydrogen is discharged in the cathode containing section of the cell through vent 37. The product from the cathode compartment is removed through discharge line 38 and consists of an 8 percent caustic soda solution. This solution is removed at the same rate of 0.05 to 0.15 gallon per minute as the water is introduced and contains less than 1 percent sodium chromate. This material may be further evaporated, if desired, for the recovery of sodium hydroxide content thereof.

In the operation of the cells in this system currents utilized typically range from 50 to 150 amps, preferably 90 to 120 amps. While the cell voltage varies somewhat those encountered are typically in the neighborhood of 5.4 to 6.5 volts cell voltages above 8 are utilized as an indication of diaphragm failure when a permionic membrane is being employed. Thus, when cell voltages reach this point, the cells are usually shut down for repair and/ or replacement of membrane. Typically, anode current densities range between 65 to 170 amps per square foot.

Many types of membranes may be employed for use in this process. Generally speaking, any cation exchange membrane can be employed which is capable of withstanding the dichromate liquor on one side and the caustic soda solutions produced on the other side during electrolysis. Thus, a cation exchange membrane such as Ionac XLMC-3235 manufactured by the Ionac Chemical Company may be employed. Another effective membrane we have found is divinyl benzene-citraconic anhydride copolymer.

This latter membrane may be prepared by dissolving the divinyl benzene in methylene chloride. Citraconic anhydride is then added to the divinyl benzene solvent mixture and stirred. Methyl ethyl ketone peroxide is added to the mixture slowly and mixed thoroughly. Cobalt naphanate is added very slowly to the mixture. An asbestos paper Crocidolite type 41–H manufactured by the North American Asbestos Corporation being preferred is placed in an aluminum foil dip tray and the monomer solution is poured over the paper until the paper is completely wet. The paper is then removed from the tray and the surplus monomer is allowed to drain back on the tray. The saturated paper is then placed on a sheet of aluminum foil on a flat surface and covered with a second sheet of foil and sealed. The sealed sheets are then stacked on a flat surface and left for 72 hours. After 72 hours the foil is removed and the solvent is allowed to evaporate. When the solvent has flashed the membranes are preferably soaked in a 5 percent caustic soda solution for at least 24 hours and then are utilized in the cells of the instant invention.

While the above referred to membranes are particularly effective for utilization in this system as has been previously stated it is, of course, possible to utilize an ordinary asbestos diaphragm such as is used in the alkalichlorine industry.

In utilizing this invention sodium dichromate was produced in a manner shown in FIGURE 1. The chromate liquor entering the carbonator in this system was carbonated in the manner described in U.S. Patent 2,931,704. Sodium dichromate liquor recovered from the centrifuge was introduced into the evaporator feed tank. The flow of evaporator feed to the evaporator below it was at a rate of approximately 40 gallons per minute. A bleed stream was taken from this evaporator feed line at the rate of 2 to 5 gallons per minute. This bleed stream contained sodium dichromate, sodium chromate, water and sodium chloride, the sodium chloride content being approximately 0.5 percent by weight of the solution. Simultaneously with the addition of this material to the anode compartment of this cell water was introduced into the cathode compartment of the cell at the rate of 0.05 to 0.15 gallon per minute. The anode and cathode of the cell were connected to an electrical source of energy supplying 100 amps of current to the cell and the cell operated at a voltage of 5.4 to 6.5 volts. From the anode compartment of the cell a sodium chromate-sodium dichromate water solution substantially depleted of chloride ion was removed and recycled to the evaporator feed tank. Approximately 0.5 to 1.0 cubic foot per minute of gas and water at the rate of 0.4 pound per hour was removed from the anode compartment of the cell. The gas contained both chlorine and element oxygen. The vent gas from the cathode compartment of the cell was removed at the rate of 0.5 to 1.0 cubic foot per minute and approximately 4 pounds of water per hour were removed with this gas. The gas was elemental hydrogen. A caustic product was removed at the rate of 0.05 to 0.15 gallon per minute from the cathode compartment of the cell and contained 8 percent sodium hydroxide by weight and less than 1 percent $Na_2CrO_4$.

In the above experiment the solution in the catholyte compartment contained 8 percent NaOH by weight. The NaOH concentration of the catholyte is controlled by the amount of water fed into the cathode compartment and the amount of solution withdrawn. While any conventional NaOH (or equivalent alkali metal hydroxide concentration) is feasible, it is found that power consumption is held at a minimum if the solution is held at about 1 to 15 percent by weight alkali metal hydroxide (NaOH) usually about 4 to 8 percent. At these concentrations the conductivity of the catholyte is relatively good and little back migration or diffusion of alkali metal ion into the anolyte takes place.

As has been previously stated, if desired, this invention can be applied to the raw liquid shown in FIGURE 1 or the raw liquid as shown in FIGURE 2. In this latter case, however, cells will have to be increased in size considerably and flow rates somewhat reduced in the anode compartment of the cell since the invention to be effective requires that the chlorine overvoltage be much lower than the oxygen overvoltage during cell operation. For this reason it will be necessary to electrolyze the sodium chromate liquor in an electrolytic cell of this character for a considerable period of time to convert a substantial portion of the sodium chromate to sodium dichromate, thus substantially reducing the pH usually below 8 and preferably imparting an acid pH to the liquor in the anode compartment. Once the acid pH has been achieved and the pH is less than 7, substantial removal of chloride ions can be readily achieved.

While the invention has been described with reference to certain specific examples and illustrative embodiments, it is not intended that the application be thereby limited except insofar as appears in the accompanying claims.

I claim:

1. A method of reducing halide impurity content of an aqueous alkali metal dichromate solution which comprises feeding the dichromate solution to an electrolytic cell, electrolyzing the solution in the cell, evolving halogen at the anode of the cell and removing dichromate solution of substantially reduced halide content from the cell.

2. The method of claim 1 wherein the pH of the dichromate solution fed to the cell is below the pH of aqueous alkali metal chromate.

3. The method of claim 1 wherein the pH of the dichromate solution fed to the cell does not exceed 8.

4. The method of claim 1 wherein dichromate solution is removed from the cell before its pH falls below about 2 to avoid excessive chromic acid generation.

5. A method of reducing chloride impurity content of aqueous sodium dichromate solution which comprises feeding the dichromate solution to the anode compartment of an electrolytic cell containing a diaphragm which separates its anode from its cathode, introducing electrolyte in the cathode compartment of the cell, passing current through the cell to cause gaseous chlorine to discharge at the anode and withdrawing from said anode compartment dichromate solution of reduced chloride content.

6. The method of claim 5 wherein the dichromate solution fed to the cell is at a pH below about 7.

7. The method of claim 5 wherein the chloride impurity content is below 10 percent by weight basis the $CrO_3$ content of the dichromate solution.

8. The method of claim 5 wherein sufficient water is introduced in the cathode compartment of the cell to maintain the sodium hydroxide concentration therein at about 1 to 15 percent by weight.

9. The method of claim 5 wherein electrolysis of the dichromate solution is discontinued before its pH falls below about 2 to avoid excessive chromic acid generation.

10. A method of producing sodium dichromate dihydrate comprising roasting chrome ore, lime and sodium carbonate at elevated temperature to produce a roasted mixture, water leaching said mixture to produce a liquor containing dissolved chrome values having chloride contamination, acidifying said liquor to convert its chrome values at least in part to sodium dichromate, feeding said acid treated liquor to an evaporation step, removing as a side stream a portion of said feed for said evaporation step, introducing said side stream to the anode compartment of electrolytic cell having an anode, a cathode compartments and a diaphragm separating said compartments, introducing electrolyte to the cathode compartment of said cell, passing current through said cell to cause gaseous chlorine to be discharged at said anode, removing said liquor from said anode compartment and returning it as feed for said evaporating step, evaporating said liquor to concentrate the chrome values therein and crystallizing sodium dichromate dihydrate from said evaporated liquor.

11. The method of claim 10 wherein the said acidification is a carbonation and wherein the pH of the side stream fed to said cell is not in excess of 8.

References Cited

UNITED STATES PATENTS

| | | | |
|---|---|---|---|
| 743,668 | 10/1903 | Suchy et al. | 204—89 |
| 779,705 | 1/1905 | Gibbs | 204—89 |
| 802,205 | 10/1905 | Gibbs | 204—89 |
| 2,635,993 | 4/1953 | Snavely | 204—89 |
| 3,305,463 | 1/1967 | Carlin | 204—89 |

JOHN H. MACK, Primary Examiner.

H. M. FLOURNOY, Assistant Examiner.

U.S. Cl. X.R.

204—89, 128